United States Patent
Lenart et al.

[11] Patent Number: 5,880,679
[45] Date of Patent: Mar. 9, 1999

[54] METHOD FOR PROTECTING VEHICLES AGAINST UNAUTHORIZED USE

[75] Inventors: Siegleif Lenart, Kernnen; Thomas Rick, Backnang; Peter Wagner, Remshalden; Gerrit Huy, Stuttgart; Ralf Piske, Salem, all of Germany

[73] Assignee: Mercedes-Benz AG, Germany

[21] Appl. No.: 614,929

[22] Filed: Mar. 11, 1996

[30] Foreign Application Priority Data

Mar. 10, 1995 [DE] Germany .................. 195 08 369.5

[51] Int. Cl.$^6$ .................. G06F 7/04; B60T 7/16; B60T 31/16; B60R 25/04
[52] U.S. Cl. .................. 340/825.31; 180/168; 180/173; 307/10.5
[58] Field of Search .................. 340/825.31, 825.49, 340/539, 825.6; 307/10.2, 10.3, 10.4, 10.6; 180/287

[56] References Cited

U.S. PATENT DOCUMENTS

| | | | |
|---|---|---|---|
| 4,636,651 | 1/1987 | Kilgore | 307/10 |
| 4,740,792 | 4/1988 | Sagey et al. | 342/457 |
| 4,805,722 | 2/1989 | Keating et al. | |
| 4,839,640 | 6/1989 | Ozer et al. | 340/825.31 |
| 5,276,728 | 1/1994 | Pagliaroli et al. | |
| 5,519,255 | 5/1996 | Burtch et al. | 307/10.2 |
| 5,557,254 | 9/1996 | Johnson et al. | 340/426 |
| 5,686,765 | 11/1997 | Washington | 307/10.5 |

FOREIGN PATENT DOCUMENTS

| | | |
|---|---|---|
| 0387581 A3 | 9/1990 | European Pat. Off. . |
| 0451482 A1 | 10/1991 | European Pat. Off. . |
| 32 25 506 A1 | 1/1984 | Germany . |
| 4310098 | 9/1994 | Germany . |
| 4320174 | 12/1994 | Germany . |
| 4415052 | 11/1995 | Germany . |
| A9202255 | 7/1994 | Netherlands . |
| WO 92/15761 | 9/1992 | WIPO . |

*Primary Examiner*—Brian Zimmerman
*Assistant Examiner*—Anthony A. Asongwed
*Attorney, Agent, or Firm*—Evenson, McKeown, Edwards & Lenahan, P.L.L.C.

[57] ABSTRACT

The invention relates to a method for protecting against unauthorized use of a vehicle which has bidirectional communication with a master station, whereby it is possible not only to transmit exclusively a position message of the vehicle to the master station or to transmit exclusively enabling signals to the vehicle from the master station, but also to make the communication appropriate to requirements. The necessary transmission of information is substantially reduced in that the enabling signal is broadcast only when requested by the vehicle. On the other hand, it is still not possible for the enabling to be carried out at the vehicle end only.

32 Claims, 3 Drawing Sheets

METHOD FOR PROTECTING VEHICLES AGAINST UNAUTHORIZED USE

BACKGROUND AND SUMMARY OF THE INVENTION

The invention relates to a method for protecting vehicles against unauthorized use by broadcasting a use enabling signal from a master station.

Such a protection arrangement is disclosed, for example, German patent document DE-A 44 40 975.3-51, in which an anti-theft control unit and a receiving device of a mobile communication system are arranged in the vehicle. A communication structure aboard the vehicle permits, on the one hand, the exchange of data between an anti-theft control unit and the receiving device and, on the other hand, the exchange of data between the anti-theft control unit and at least one operationally necessary control unit of the vehicle. As long as a vehicle has not been reported stolen, or provided another unauthorized use of the vehicle has not been determined, signals are transmitted from a master station to the vehicle via the mobile communication system at regular time intervals, the said signals being received by the receiving device. The reception of the signals is conveyed from the receiving device to the anti-theft control unit via the communication structure. The signals are detected and if they are determined to be directed at the vehicle, operation of the vehicle is enabled for a prescribed time period which is longer than the time interval between two successive signals. If no signal is received before expiration of the period for which operation of the vehicle is enabled, the enabling of operation of the vehicle is not prolonged. The anti-theft control unit then actuates the at least one operationally necessary control unit via the communication structure and prevents the further operation of this control unit, at least at the next attempt to activate the vehicle.

This measure prevents a vehicle from being used without authorization over a relatively long period of time. Also, operation is not dependent on signals which are emitted by the vehicle and may be disrupted, but is instead dependent exclusively on reception of the signals broadcast by the master station so that disruption or destruction of the communication system does not permit prolonged use of the vehicle.

A disadvantage of this method, however, is that it does not enable a location of the vehicle. As a result, it is still possible, for example after misappropriating the vehicle, to transfer it to another location on a transporter, without risk. In addition, a relatively long period of time may pass between the time when the unauthorized use of the vehicle starts and the time when the information relating to the unauthorized use is conveyed to the master station, so that broadcasting of the signals may not commence until a considerable period of time after the unauthorized use has started. During this period of time, the unauthorized use of the vehicle can be continued unhindered. In addition, if a large number of vehicles are to be protected in this manner, a very large transmission capacity is required for the signals which are broadcast at regular time intervals. Therefore, this method is suitable only for protecting a strictly limited number of vehicles.

Furthermore, it is known for example from the article "Satellitenhilfe gegen Auto-Klau" [Using satellites to combat car theft] by R. Gramm in the journal Funkschau Issue 16/1993 pp. 42 to 45 to provide a locating system which is arranged in the vehicle and determines, continuously or at regular intervals, the geographic area the vehicle is located, and conveys this information to a master station via a transmitting device aboard the vehicle end. A receiving unit for receiving and evaluating the locating information broadcast by the transmitting device is present in this master station. The location of the vehicle can thus be monitored continuously or at regular intervals in the master station.

This device has the disadvantage that it provides no arrangement for disabling the vehicle. The tracking of the vehicle by the master station can also be prevented, for example, by destroying the transmitting device at the vehicle end or the locating system. In addition, a large capacity in terms of transmitting devices and transmitting frequencies must be made available if a large number of vehicles are to be tracked continuously. If for example a digital radio telephone is used as the mobile communication system, high communication costs are incurred in order continuously to convey the results of the locating of the vehicle to the master station.

The object of the present invention is to prevent reliably the unauthorized use of a vehicle, even if the communication between the vehicle and master station is prevented.

Another object of the invention is to locate the vehicle, at least if an unauthorized use occurs. In this context, the system is to operate in a cost effective way and is also to be capable of monitoring a large number of vehicles.

This object is achieved by the method according to invention, in which a master station broadcasts an enabling signal. For this purpose, an antitheft control unit located aboard the vehicle transmits a status signal containing vehicle identifying data when enabling of the vehicle is cancelled. The master station checks to determine whether it has received an indication of unauthorized use of the vehicle, and absent such an indication, transmits an enabling signal, which causes the antitheft control unit to extend the authorized use of the vehicle for a predetermined period. If no enabling signal is received within a prescribed time period, at least one operationally essential vehicle system is disabled, and a vehicle location signal is broadcasted from the vehicle.

Communication between the vehicle and master station is bidirectional. As a result, it is possible not only to transmit exclusively a position message of the vehicle to the master station or to transmit exclusively enabling signals to the vehicle from the master station, but also to make the communication appropriate to requirements. The necessary transmission of information is substantially reduced in that the enabling signal is not broadcast continuously, but only when requested by the vehicle. On the other hand, the master station is simultaneously informed of the current location of the vehicle at least if the vehicle is not enabled. The communication between the vehicle and the master station must be maintained so that the enabling signal can be transmitted from the master station to the vehicle in good time.

Other objects, advantages and novel features of the present invention will become apparent from the following detailed description of the invention when considered in conjunction with the accompanying drawings.

DETAILED DESCRIPTION OF THE DRAWINGS

Figure 1:
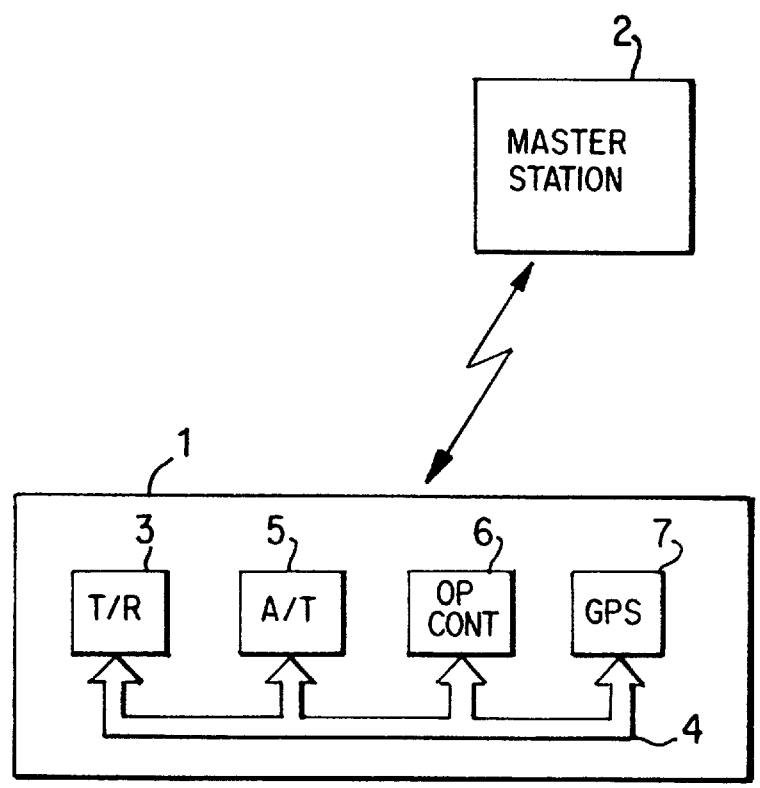
FIG. 1 is a schematic diagram of an apparatus for carrying out the method according to the invention.

FIG. 1 shows an arrangement for carrying out the method according to the invention. A transmitting device and a receiving device, which may be combined in a common system 1, are provided for transmitting data between the vehicle and a master station 2. This may be for example a mobile telephone which transmits digital data, for example Digital European Cordless Telephones (DECT). The telephone system at the vehicle end must, however, be capable of automatically establishing a connection to the master station. In order to permit the telephone to communicate in the meantime, the connection set up for the purpose of checking the authorized use of the vehicle (any form of exchange of data) must be capable of being carried out with conversations possibly being carried out by vehicle occupants in the background. The transmission of data or of signals between the vehicle and the master station, and vice versa, always occurs here in coded (ciphered etc.) form in order to prevent third parties from being able to broadcast corresponding signals which are interpreted by the master station as coming from a vehicle, or by the vehicle as coming from the master station. The signals broadcast by the vehicle and master station must always have a vehicle-specific identification in order to prevent confusion between vehicles and to avoid the wrong vehicle's being incorrectly disabled or enabled.

A communication structure 4 is provided in the vehicle, by which the transmitting device and receiving device 3 communicates with the anti-theft control unit 5 and at least one operationally necessary control unit 6. Data buses, for example CAN, VAN or D2B, may serve as the communication structure. The transmission of the data via the communication structure may also occur in coded form.

For locating purposes, a locating system 7, such as for example GPS (Global Positioning System), is required in the vehicle. This, too, is connected to the anti-theft control unit via the communication structure of the vehicle.

In this context, the anti-theft control unit 5 or the entirety of the control units connected to the communication structure can continuously perform checks of the system integrity, and in case of an attack on the system integrity they can deactivate the at least one operationally necessary control unit 6 and the transmission of locating signals.

Figure 2:
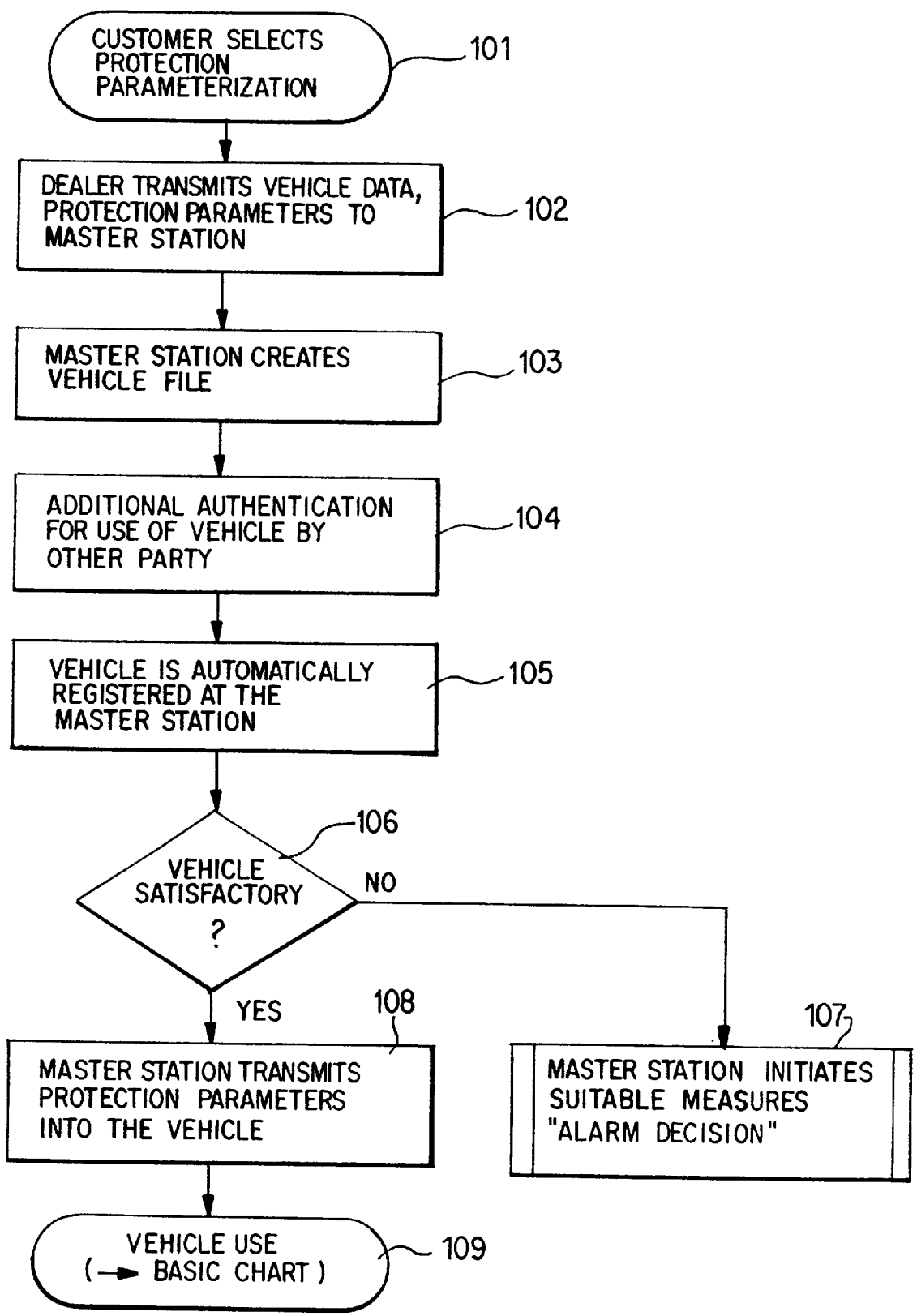
FIG. 2 is a flow chart which shows a method for registering a vehicle at a master station.

FIG. 2 is a flow chart of an initialization process for registering a vehicle at a master station which monitors the operation of the vehicles. When an unauthorized use occurs further operation of the vehicle is prevented, and the location of the vehicle is tracked, either at the instigation of the master station or as a result of the failure of enabling signals to be transmitted by the master station.

In step 101, the purchaser of the vehicle selects those protection parameters which he considers desirable for the protection of his vehicle, from among a menu of possible protective measures. The measurement of the sequence of each protection parameter is carried out starting from the last time it was enabled. The protection parameters presented below as examples can be used individually or in any desired combination with one another. In this context, both "AND" logic combinations and "OR" logic combinations of the protection parameters can be executed. The protection parameters can comprise for example the distance travelled, the operating time of the vehicle, the time measured independently of the operation of the vehicle, a geographically limited area as well as the number of activations of the vehicle.

In step 102, this data is conveyed, together with an identification of the vehicle, to the fixed master station, where a corresponding file for the vehicle is created in step 103. In step 104, further data can also be stored in the file, such as the approval of the vehicle for road use by the TUV [German Technical Supervision Authority], the licensing authority or the insurance company.

In step 105, the vehicle is registered automatically at the master station, for example when it is first activated. In step 106, it is checked whether the registering of the vehicle at the master station is satisfactory (that is, whether a corresponding file for the vehicle has been satisfactorily created and whether the vehicle has been enabled). If not, suitable measures are taken by the master station in step 107. Operation of the vehicle can be prevented; and if a locating signal which represents the current geographical location of the vehicle has not yet been transmitted from the vehicle to the master station, this is now requested. It is possible to notify, for example, appropriate authorities, such as the police, giving the location of the vehicle.

If, in contrast, it is determined in step 106 that the vehicle is satisfactory, in step 108 the master station transmits to the vehicle the at least one protection parameter and, if appropriate, the logic combination of the protection parameters. In step 109, the use of the vehicle is now monitored by means of an anti-theft control unit at the vehicle to determine whether the at least one parameter which is to be monitored exceeds the associated value prescribed as a protection parameter. As soon as the prescribed combination of protection parameters leads to the logical conclusion that a relevant violation of protection parameters has taken place, the vehicle is disabled by the anti-theft control unit. Further operation is prevented in that at least one operationally necessary control unit, such as the electronic engine control or the electronic gearbox control, is deactivated unless an enabling signal has been received in good time from the receiving device at the vehicle, and has been conveyed via the vehicle's own communication structure to the anti-theft control unit. The deactivation is described in greater detail below.

Figure 3:
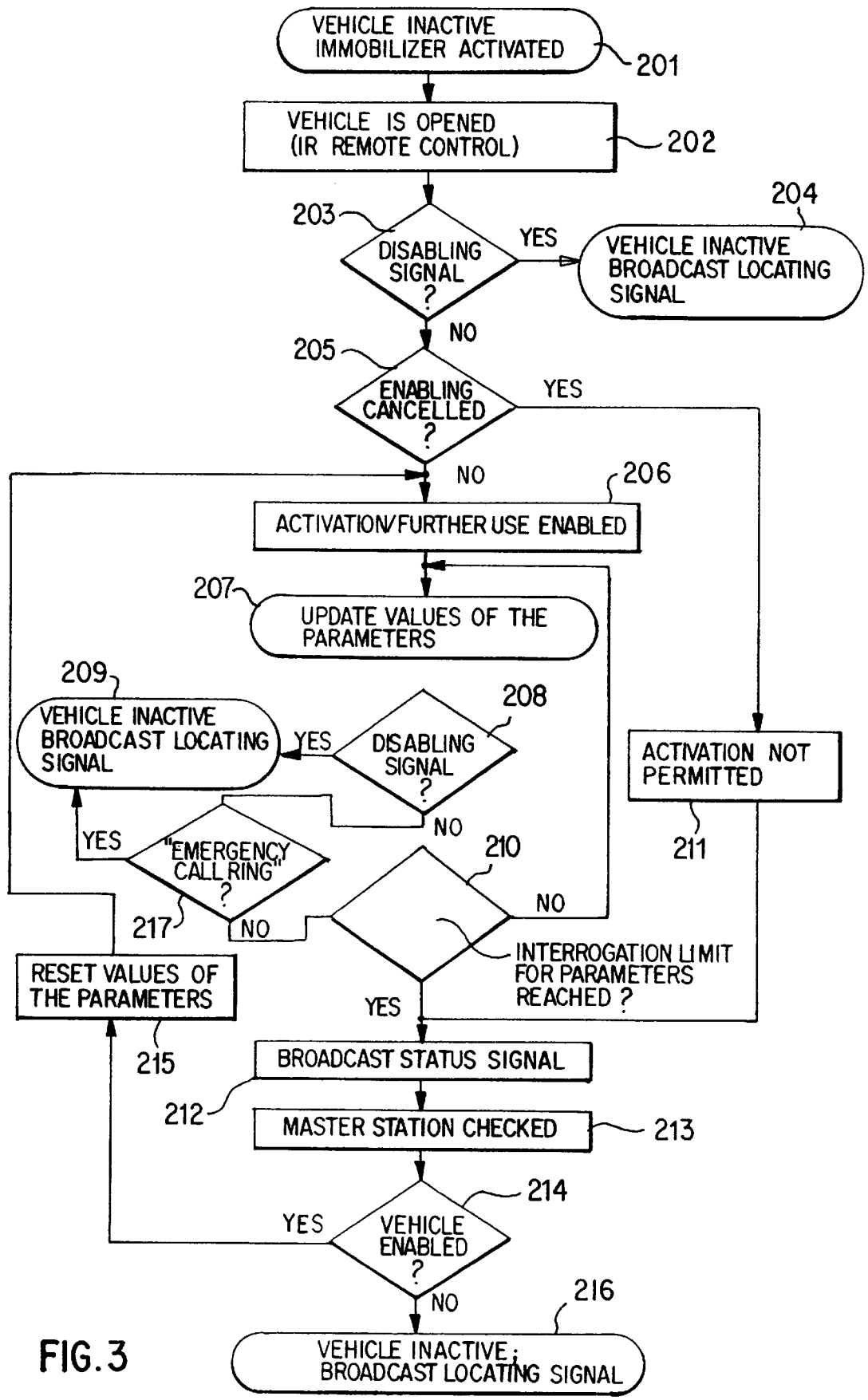
FIG. 3 is a the flow chart which shows a method according to the invention which is particularly suitable for use in privately owned cars.

FIG. 3 is a flow chart which shows a method according to the invention such as is suitable in particular for monitoring for unauthorized use of a privately owned vehicle. In the case of privately owned vehicles it can usually be assumed that the single possible unauthorized use of the vehicle is its theft. If the vehicle is disabled satisfactorily in step 201, the authorized user of the vehicle will wish to open the locked doors of the vehicle in a first step of the activation process. This can be done in accordance with step 202 using a key which transmits coded data. During this process, the anti-theft control unit evaluates any attempt to activate the vehicle without authorization—the authorization is recognized by the key code which is detected as valid—as an attempted theft, deactivate the vehicle and transmits a locating signal. In step 203, it is checked whether a disabling signal broadcast by the master station was received in the period of time during which the vehicle was disabled. If so, in step 204, the at least one operationally necessary control unit (here the engine control) is deactivated by the anti-theft control unit, and a locating signal is transmitted.

Otherwise, it is checked in step 205 whether the enabling has been cancelled. If so, in step 211 the starting of the vehicle is not permitted in that at least one operationally necessary control unit is deactivated. A message concerning this condition can be issued to the driver for example by indicating it on the dashboard. Step 211 is followed by step 212.

If, in contrast, in step 205 it is determined that the enabling has not been cancelled, step 206 permits the starting of the vehicle and its further, and an immobilizer which is present is deactivated. In the following step 207 the values of the monitored parameters are updated. In step 208 it is interrogated whether a disabling signal has been received. If it has, in step 209 starting of the vehicle is prevented after the next deactivation of the vehicle in that, at least at that time, and operationally necessary control unit is deactivated.

Alternatively, operation of the vehicle can be progressively terminated in that for example its driving capabilities are progressively reduced by means of the engine control and/or, if appropriate, the gearbox control until the vehicle slowly comes to a standstill. When the vehicle is at a standstill, the operationally necessary control unit (engine control, gearbox control) can then be deactivated, so that the vehicle is disabled. This prevents the vehicle's continuing to be moved during a long period of time after a disabling signal has been received.

When the disabling signal is received, a current locating signal can be additionally broadcast periodically in a fixed chronological sequence. The chronologically fixed sequence comprises two locating signals which are transmitted shortly one after the other, for example within less than one minute or even less than 30 seconds, and an adjoining waiting time without the broadcasting of a locating signal. The broadcasting of the locating signal which takes place twice in brief succession is intended to permit the master station to determine not only the current location of the vehicle but also its direction of travel. The minimum chronological interval is downwardly limited here by the resolution of the locating system. The adjoining waiting time is to be selected to be sufficiently short that on the one hand reasonable tracking of the vehicle from the master station is made possible and on the other hand overloading of the master station by an excessively large data input is avoided. Continuous transmission of the locating signal, for example every 30 seconds, is also possible.

If it has been determined in step 208 that a disabling signal has not been received, in step 217 it is checked whether a switching device which can be intentionally activated by a vehicle occupant, for example a so-called "emergency call key" has been activated. If it has, either an alarm is issued at the master station and at least one locating signal is transmitted, or the system jumps to step 209 and the vehicle is deactivated. Otherwise, in step 210 it is checked whether the enabling of the vehicle has been cancelled. If this is not the case, the system jumps back to step 207. Otherwise, in step 212 a connection from the vehicle to the master station is established and a status signal is transmitted.

In step 213 it is determined whether further enabling of the vehicle can take place. (This is the case if no indication of an unauthorized use is present in the master station; that is, if it has not been signalled to the master station that the vehicle has been for example stolen, scrapped, deregistered at the licensing authority or its insurance cover has expired.) Only then is an enabling signal broadcast by the master station.

In step 214 if an enabling signal has also been received by the vehicle after the broadcasting of the status signal, the system goes to step 215 and the values of the monitored parameters are reset. The vehicle is thus released until the enabling is cancelled again. The system then jumps back to step 206.

It is also possible to check whether a period of time which is longer than a defined interrogation time period has passed since the first broadcasting of a status signal after the last reception of an enabling signal. If not, the system can jump to step 207 even without reception of the enabling signal. This makes it possible for the vehicle not to be deactivated immediately, if there is for example shadowing on the connection between the master station and the vehicle, but instead permits further attempts to establish a connection to be carried out during the interrogation time period so that an enabling signal can still be received. The interrogation time period may be strictly limited, for example, to several minutes, (e.g., 5 minutes), or several kilometers, (e.g., 20 kilometers). However, a more generously dimensioned interrogation time period of several hours or several hundred kilometers may also be selected. The interrogation time period can be specified individually according to the desires of the owner of the vehicle. In principle, any of the variables which can lead to the enabling being cancelled are also suitable as a criterion for the duration of the interrogation time period.

If it is determined in step 214 that an enabling signal has not been received, or that a restricted interrogation time period has passed without the reception of an enabling signal, the system jumps to step 216, and the further operation of the vehicle is prevented in the same way as in the alternatives to step 209. That is, either the vehicle is not activated after the next deactivation, or else a progressive deactivation of the vehicle takes place.

Once a vehicle has been disabled by deactivation of an operationally necessary control unit at the instigation of the anti-theft control unit, the vehicle can be reactivated, for example, by receipt of an operation enabling signal broadcast by the master station, which signal is conveyed to the anti-theft control unit. The anti-theft control unit tests the signal and if it is determined to be as valid, it cancels the disabling of operationally necessary control units, so that the vehicle can be driven again. The broadcasting of the operation enabling signal by the master station takes place for example when an appropriate message from an authority or the owner of the vehicle is received at the master station.

Alternatively or additionally there may be provision for the reactivation only if a code which is detected as valid by the anti-theft control unit is entered via a data input interface which is connected to the unit. In this context, it is advantageous if the number of units which generate an appropriate code is small, and they are subject to monitoring by the master station.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for protecting against unauthorized use of a vehicle having a communication structure for the exchange of data at least between a transmit/receiving device, a mobile communication system, an anti theft control unit and at least one operationally necessary control unit, the transmit/receiving device receiving enabling data broadcast by a master station, the reception of which enables further operation of the vehicle for an interval defined by preset operating parameters, and absence of which results in a deactivation of the at least one operationally necessary control unit, said method comprising the steps of:

the anti-theft control unit transmits a status signal to the master station whenever a previous enabling of the vehicle has expired, which status signal contains vehicle data, including at least an identification of the vehicle;

in response to a received status signal, the master station determines whether an indication of an unauthorized use of the vehicle or other disqualifying condition has been issued;

if an indication of unauthorized use or other disqualifying condition has not been issued, the master station transmits an enabling signal to the vehicle in response to the received status signal;

when the enabling signal is received, the anti-theft control unit extends enabling of the vehicle by a predetermined amount; and at least if no enabling signal is received by the transmit/receiving device after a defined interrogation interval has expired following transmission of a status signal, the at least one operationally necessary control unit is disabled and at least one locating signal, which represents the current location of the vehicle determined on the basis of a locating process carried out at the vehicle, is broadcast by the transmit/receiving device of the vehicle.

2. Method according to claim 1 further comprising the steps of:

in the case of an attempt to activate the vehicle without authorization, broadcasting of a status signal indicative thereof.

3. Method according to claim 2 wherein a status signal which contains information relating to an attempt to activate the vehicle without authorization is evaluated as an indication of an unauthorized use of the vehicle, and broadcasting of an enabling signal is discontinued.

4. Method according to claim 1 wherein the anti-theft control unit checks functioning of at least one of the communication system, the transmit/receiving device, and the anti-theft control unit, degradation of the system integrity leading to the broadcasting of a status signal indicative thereof.

5. Method according to claim 4 wherein a status signal which contains information relating to degradation of the system integrity is evaluated as an indication of an unauthorized use of the vehicle, and broadcasting of an enabling signal is discontinued.

6. Method according to claim 1 wherein the broadcast status signal contains a locating signal.

7. Method according to claim 1 wherein if an enabling signal is not received by the transmit/receiving device of the vehicle after the broadcasting of a status signal, a current locating signal is broadcast periodically in a fixed chronological sequence.

8. Method according to claim 7 wherein the fixed chronological sequence comprises two locating signals which are broadcast successively within an interval and one waiting time immediately following the interval, without the broadcasting of a locating signal.

9. Method according to claim 8 wherein the interval has a duration of less than one minute.

10. Method according to claim 8 wherein the interval has a duration of less than 30 seconds.

11. Method according to claim 1 wherein enabling of the vehicle is cancelled upon expiration of a prescribed time interval, which is independent of the use of the vehicle.

12. Method according to claim 1 wherein cancellation of enabling is performed upon expiration of a prescribed operating interval for operation of the vehicle.

13. Method according to claim 1 wherein cancellation of enabling is performed when a prescribed distance travelled of the vehicle is exceeded.

14. Method according to claim 1 wherein cancellation of enabling is performed when a prescribed number of activations of the vehicle is exceeded.

15. Method according to claim 1 wherein cancellation of enabling is performed when a locating process carried out by the vehicle indicates that a specific prescribed geographical area has been left.

16. Method according to claim 1 wherein cancellation of enabling is performed when a locating process carried out by the vehicle indicates that a specific prescribed geographical area has been entered.

17. Method according to claim 1 wherein cancellation of enabling occurs as a result of intentional activation of a switching device by an occupant of the vehicle.

18. Method according to claim 1 wherein when a disabling signal which has been broadcast by the master station is received by the receiving device, a deactivation of at least one operationally necessary control unit is carried out by the anti-theft control unit.

19. Method according to claim 18 wherein:

when the vehicle is activated it is checked whether a disabling signal has been received in the meantime; and if a disabling signal has been received, activation of the vehicle is prevented by the deactivation of at least one operationally necessary control unit.

20. Method according to claim 18 wherein after the reception of a disabling signal a vehicle-locating process is performed, and a locating signal is broadcast at least once.

21. Method according to claim 1 wherein a locating signal is broadcast at every attempt to activate the vehicle.

22. Method according to claim 1 wherein the interrogation interval comprises a time period which is measured starting from the broadcasting of a first status signal which takes place in response to the reception of a most recent enabling signal to be received.

23. Method according to claim 1 further comprising the steps:

if the vehicle receives an operation enabling signal broadcast by the master station, deactivation of the at least one operationally necessary control unit is cancelled by the anti-theft control unit via the communication structure.

24. Method according to claim 1 wherein:

a data input interface which is connected to the anti-theft control unit is arranged at the vehicle end, at least the inputting of a code, which has been detected as valid, via the data input interface is required in order to reactivate the at least one operationally necessary control unit.

25. Method for protecting against unauthorized use of a vehicle having a communication structure for the exchange of data at least between a transmit/receiving device, a mobile communication system, an anti theft control unit and at least one operationally necessary control unit, the transmit/receiving device receiving enabling data broadcast by a master station, the reception of which enables further operation of the vehicle for an interval defined by preset operating parameters, and absence of which results in a deactivation of the at least one operationally necessary control unit, said method comprising the steps of:

the anti-theft control unit transmits a status signal to the master station whenever a previous enabling of the vehicle has expired, which status signal contains vehicle data, including at least an identification of the vehicle;

in response to a received status signal, the master station determines whether an indication of an unauthorized use of the vehicle or other disqualifying condition has been issued;

if an indication of unauthorized use or other disqualifying condition has not been issued, the master station transmits an enabling signal to the vehicle in response to the received status signal;

when the enabling signal is received, the anti-theft control unit extends enabling of the vehicle by a predetermined amount; and at least if no enabling signal is received by the transmit/receiving device following transmission of a status signal, the at least one operationally necessary control unit is disabled and at least one locating signal, which represents the current location of the vehicle determined on the basis of a locating process carried out at the vehicle, is broadcast by the transmit/receiving device of the vehicle.

26. Method for protecting against unauthorized use of a vehicle according to claim 25, wherein said at least one operationally necessary control unit is disabled if no enabling signal is received after expiration of a defined interrogation interval has expired following said transmission of a status signal.

27. Method for protecting against unauthorized use of a vehicle according to claim 1 wherein said interrogation interval is determined by a limit with respect to at least one of elapsed total time, elapsed vehicle operating time, vehicle travel distance, a number of vehicle starts and geographic area.

28. Method for protecting against unauthorized use of a vehicle according to claim 25 wherein said interrogation interval is determined by a limit with respect to at least one of elapsed total time, elapsed vehicle operating time, vehicle travel distance, a number of vehicle starts and geographic area.

29. Method for protecting against unauthorized use of a vehicle having a communication structure for the exchange of data at least between a transmit/receiving device, a mobile communication system, an anti theft control unit and at least one operationally necessary control unit, the transmit/receiving device receiving enabling data broadcast by a master station, the reception of which enables further operation of the vehicle and absence of which results in a deactivation of the at least one operationally necessary control unit, said method comprising the steps of:

a transmission of an enabling signal by said master station enables operation of the vehicle, expiring when at least one preselected operating parameter has exceeded a predetermined limit;

a control unit on said vehicle monitors said operating parameters and detects when a previous enabling of the vehicle has expired;

the anti-theft control unit transmits a status signal to the master station whenever a previous enabling of the vehicle has expired, which status signal contains vehicle data, including at least an identification of the vehicle;

in response to a received status signal, the master station determines whether an indication of an unauthorized use of the vehicle or other disqualifying condition has been issued;

if an indication of unauthorized use or other disqualifying condition has not been issued, the master station transmits an enabling signal to the vehicle in response to the received status signal;

when the enabling signal is received, the anti-theft control unit extends enabling of the vehicle by a predetermined amount; and at least if no enabling signal is received by the transmit/receiving device following transmission of a status signal, the at least one operationally necessary control unit is disabled and at least one locating signal, which represents the current location of the vehicle determined on the basis of a locating process carried out at the vehicle, is broadcast by the transmit/receiving device of the vehicle.

30. Method for protecting against unauthorized use of a vehicle according to claim 29 wherein said at least one preselected operating parameter and said predetermined limit are selected and entered into the vehicle by an owner of the vehicle via a signal transmitted from the master station.

31. Method for protecting against unauthorized use of a vehicle according to claim 29 wherein said at least one operating parameter includes at least one operating parameter selected from the group consisting of elapsed total time, elapsed vehicle operating time, vehicle travel distance, a number of vehicle starts and geographic criteria.

32. Method for protecting against unauthorized use of a vehicle according to claim 29 wherein said interrogation interval is determined by a limit with respect to at least one of elapsed total time, elapsed vehicle operating time, vehicle travel distance, a number of vehicle starts and geographic area.

* * * * *